US007632324B2

(12) United States Patent
Makarov et al.

(10) Patent No.: US 7,632,324 B2
(45) Date of Patent: Dec. 15, 2009

(54) SINGLE STAGE CYCLONE VACUUM CLEANER

(75) Inventors: Sergey V. Makarov, Solon, OH (US); Robert A. Salo, Mentor, OH (US); Steven J. Paliobeis, Painesville, OH (US); Jeffrey C. Loebig, Twinsburg, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 557 days.

(21) Appl. No.: 11/436,798

(22) Filed: May 18, 2006

(65) Prior Publication Data

US 2007/0266678 A1 Nov. 22, 2007

(51) Int. Cl.
*B01D 45/12* (2006.01)

(52) U.S. Cl. .................... 55/337; 55/459.1; 55/DIG. 3; 55/429; 55/426; 15/353; 15/350; 15/351

(58) Field of Classification Search .................. 55/337, 55/459, DIG. 3, 429, 428, 486, 459.1, 426, 55/424; 15/353, 350, 351
See application file for complete search history.

(56) References Cited

U.S. PATENT DOCUMENTS 4,789,476 A 12/1988 Schulz
6,083,292 A 7/2000 Fumagalli
6,141,826 A * 11/2000 Conrad et al. ................. 15/347
6,334,234 B1 1/2002 Conrad et al.
6,461,508 B1 * 10/2002 Thomson ................. 210/512.1
6,546,593 B2 4/2003 Oh et al.
6,719,830 B2 4/2004 Illingworth et al.
6,732,405 B2 5/2004 Oh
6,859,975 B2 3/2005 Ohta et al.
2004/0025285 A1 2/2004 McCormick et al.
2004/1098827 5/2004 Oh et al.

(Continued)

FOREIGN PATENT DOCUMENTS

GB 2 417 916 A 3/2006

(Continued)

OTHER PUBLICATIONS

Communication Relating To The Results Of The Partial International Search For International Application No. PCT/US2007/011780 mailed Oct. 17, 2007, Authorized officer, Maria Zinburgova.

*Primary Examiner*—Duane Smith
*Assistant Examiner*—Dung Bui
(74) *Attorney, Agent, or Firm*—Fay Sharpe LLP

(57) ABSTRACT

The present invention relates to an upright vacuum cleaner including a housing and a nozzle base having a main suction opening. The housing is pivotally mounted on the nozzle base. The housing comprises a cyclonic separator including a dirty air inlet and a sidewall. A lower end of the separator being secured to a lower skirt. A dust collector section is located beneath the separator and includes a sidewall. A perforated tube is disposed within the separator. The perforated tube includes a shroud extending away from a closed lower end of the perforated tube. A diameter of the shroud is larger than a diameter of the separator lower end. The lower skirt and the shroud define a first air channel for directing air from the separator into the dust collector section. The first air channel has a substantially constant volume for maintaining airflow velocity.

28 Claims, 13 Drawing Sheets

U.S. PATENT DOCUMENTS

2005/0050865 A1 3/2005 Oh et al.
2005/0066469 A1 3/2005 Oh et al.
2005/0223516 A1* 10/2005 Courtney ..................... 15/351
2005/0252180 A1* 11/2005 Oh et al. ..................... 55/345
2007/0067944 A1 3/2007 Kitamura et al.
2007/0084158 A1* 4/2007 Fester ..................... 55/337
2007/0095028 A1* 5/2007 Kim et al. ..................... 55/337

FOREIGN PATENT DOCUMENTS

WO WO 00/64321 A 11/2000
WO WO 2005/089618 A 9/2005
WO WO 2006/026414 A2 3/2006

* cited by examiner

SINGLE STAGE CYCLONE VACUUM CLEANER

BACKGROUND

The present invention relates to vacuum cleaners. More particularly, the present invention relates to single stage cyclonic vacuum cleaners used for suctioning dirt and debris from carpets and floors. Such vacuum cleaners can be upright, canister hand-held or stationary, built into a house. Moreover, cyclonic designs have also been used on carpet extractors and "shop" type vacuum cleaners.

Upright vacuum cleaners are well known in the art. The two major types of traditional vacuum cleaners are a soft bag vacuum cleaner and a hard shell vacuum cleaner. In the hard shell vacuum cleaner, a vacuum source generates the suction required to pull dirt from the carpet or floor being vacuumed through a suction opening and into a filter bag or a dirt cup housed within the hard shell upper portion of the vacuum cleaner. After multiple uses of the vacuum cleaner, the filter bag must be replaced or the dirt cup emptied.

To avoid the need for vacuum filter bags, and the associated expense and inconvenience of replacing the filter bag, another type of upright vacuum cleaner utilizes cyclonic air flow and one or more filters, rather than a replaceable filter bag, to separate the dirt and other particulates from the suction air stream. Such filters need infrequent replacement.

While some prior art cyclonic air flow vacuum cleaner designs and constructions are acceptable, the need exists for continued improvements and alternative designs for such vacuum cleaners. For example, it would be desirable to simplify assembly and improve filtering and dirt removal.

Accordingly, the present invention provides a new and improved upright vacuum cleaner having a single stage cyclonic air flow design which overcomes certain difficulties with the prior art designs while providing better and more advantageous overall results.

BRIEF DESCRIPTION

In accordance with one aspect of the present invention, an upright vacuum cleaner is provided. The upright vacuum cleaner includes a housing and a nozzle base having a main suction opening. The housing is pivotally mounted to the nozzle base. The housing comprises a cyclonic separator including a dirty air inlet and a sidewall. A lower end of the separator being secured to a lower skirt. A dust collector section is located beneath the separator and includes a sidewall. A perforated tube is disposed within the separator. The perforated tube includes a shroud extending away from a closed lower end of the perforated tube. A diameter of the shroud is larger than a diameter of the separator lower end. The lower skirt and the shroud define a first air channel for directing air from the separator into the dust collector section. The first air channel has a substantially constant volume for maintaining airflow velocity.

In accordance with another aspect of the present invention, an upright vacuum cleaner includes a housing having a longitudinal axis and a nozzle base having a main suction opening. The housing is pivotally mounted on the nozzle base. An airstream suction source is mounted to one of the housing and the nozzle base for selectively establishing and maintaining a suction airstream flowing from the nozzle main suction opening to an exhaust outlet of the suction source. A dirt cup is selectively mounted to the housing. A cyclonic separator is mounted to the housing. The separator includes a dirty air inlet and a sidewall tapering from an upper end of a first diameter and a lower end of a second diameter which is smaller than the first diameter. The sidewall has an outer surface and an inner surface. The outer surface of the sidewall forms at least a part of an external surface of the vacuum cleaner. The longitudinal axis of the housing extends through the separator.

In accordance with yet another aspect of the present invention, an upright vacuum cleaner comprises a housing having a suction airstream inlet and a suction airstream outlet. A dirt container assembly is selectively mounted to the housing for receiving and retaining dirt and dust separated from the suction airstream. The suction airstream inlet and said suction airstream outlet are in fluid communication with, respectively, an inlet and an outlet of the dirt container assembly. An airstream suction source is mounted to the housing. The suction source is in communication with the outlet of the dirt container assembly. The dirt container assembly includes a cyclonic separator including a dirty air inlet and a sidewall having an outer surface and an inner surface. At least one support rib extends outwardly from the outer surface of the separator for supporting the separator.

In accordance with still yet another aspect of the present invention, a dirt container assembly for an upright vacuum cleaner comprises a single generally frusto-conical cyclonic separator including a dirty air inlet and a sidewall. A perforated tube is disposed within the separator and includes a shroud extending away from a closed lower end of the perforated tube. The shroud has an outwardly flared section and a flange extending downwardly from the flared section. A dust collector section is located beneath the separator and includes a sidewall. The flange of the shroud is generally parallel to the dust collector section sidewall.

Still other aspects of the invention will become apparent from a reading and understanding of the detailed description of the several embodiments described hereinbelow.

BRIEF DESCRIPTION OF THE DRAWINGS

The present invention may take physical form in certain parts and arrangements of parts, several embodiments of which will be described in detail in this specification and illustrated in the accompanying drawings which form a part of the disclosure.

DETAILED DESCRIPTION

It should, of course, be understood that the description and drawings herein are merely illustrative and that various modifications and changes can be made in the structures disclosed without departing from the scope and spirit of the invention. Like numerals refer to like parts throughout the several views. It will also be appreciated that the various identified components of the vacuum cleaner disclosed herein are merely terms of art that may vary from one manufacturer to another and should not be deemed to limit the present invention. While the invention is discussed in connection with an upright vacuum cleaner, it could also be adapted for use with a variety of other household cleaning appliances, such as carpet extractors, bare floor cleaners, "shop" type cleaners, canister cleaners, hand-held cleaners and built-in units. Moreover, the design could also be adapted for use with robotic units which are becoming more widespread.

Figure 1:
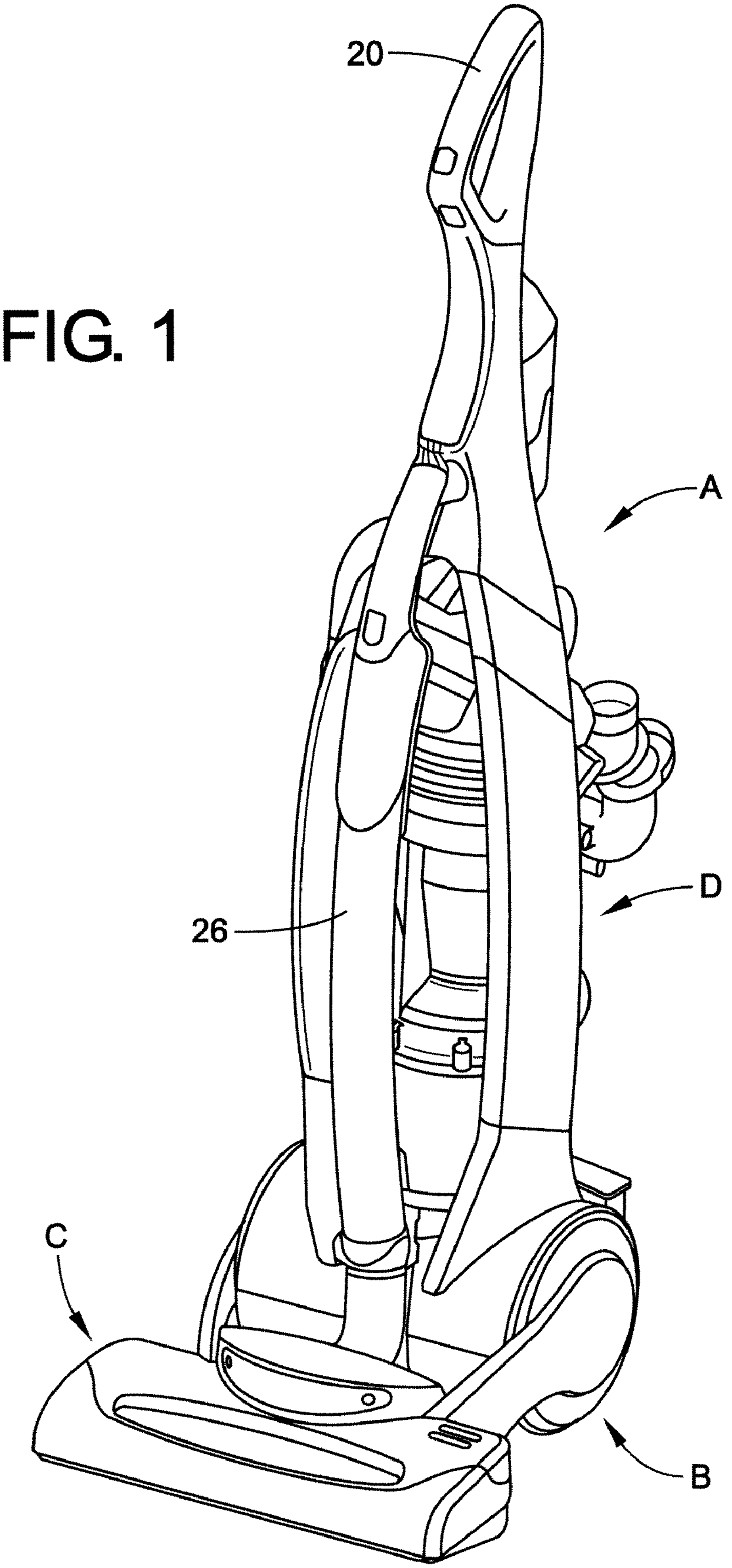
FIG. 1 is a front perspective view illustrating a single stage cyclone vacuum cleaner in accordance with a first embodiment of the present invention.
Figure 2:
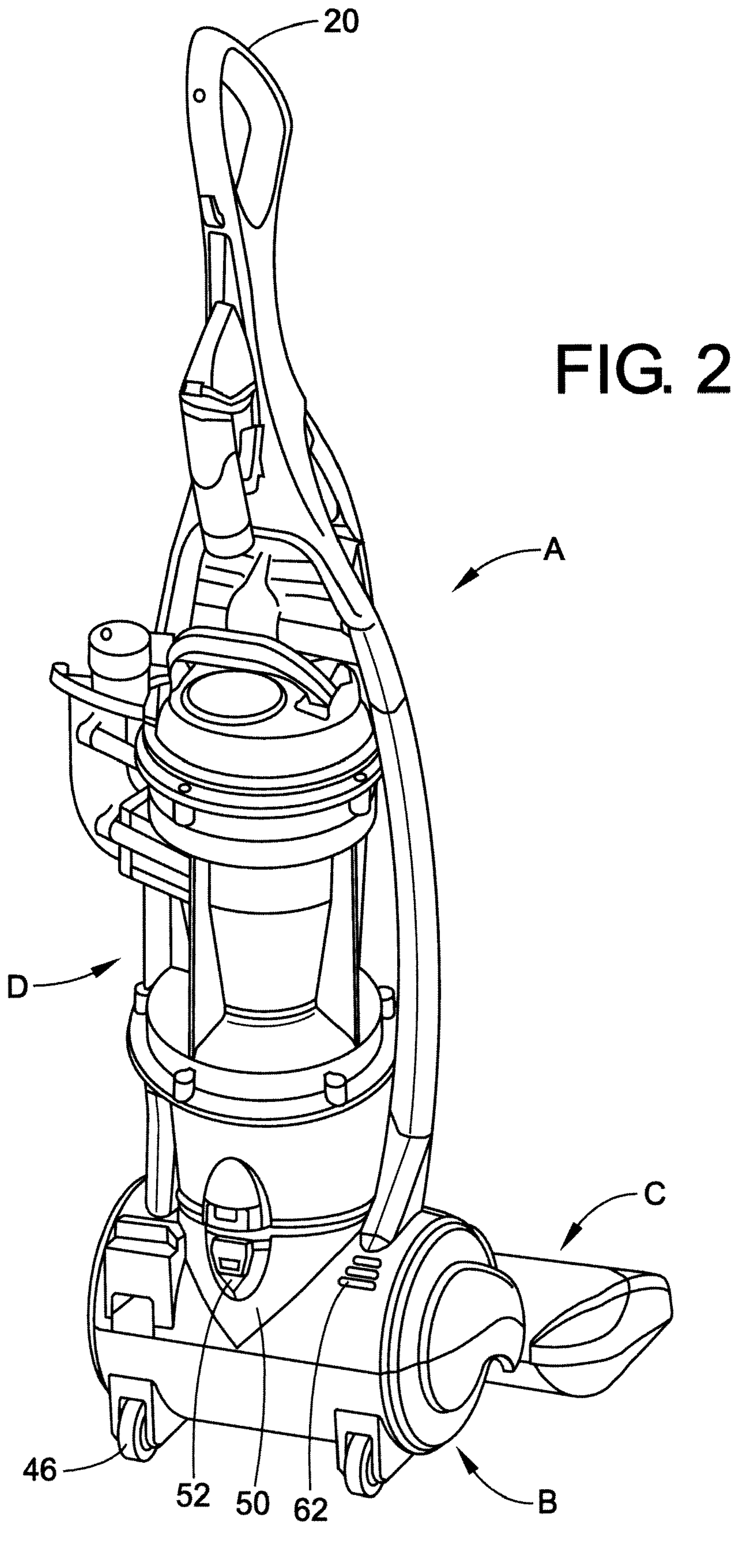
FIG. 2 is a rear perspective view of the vacuum cleaner of FIG. 1.
Figure 3:
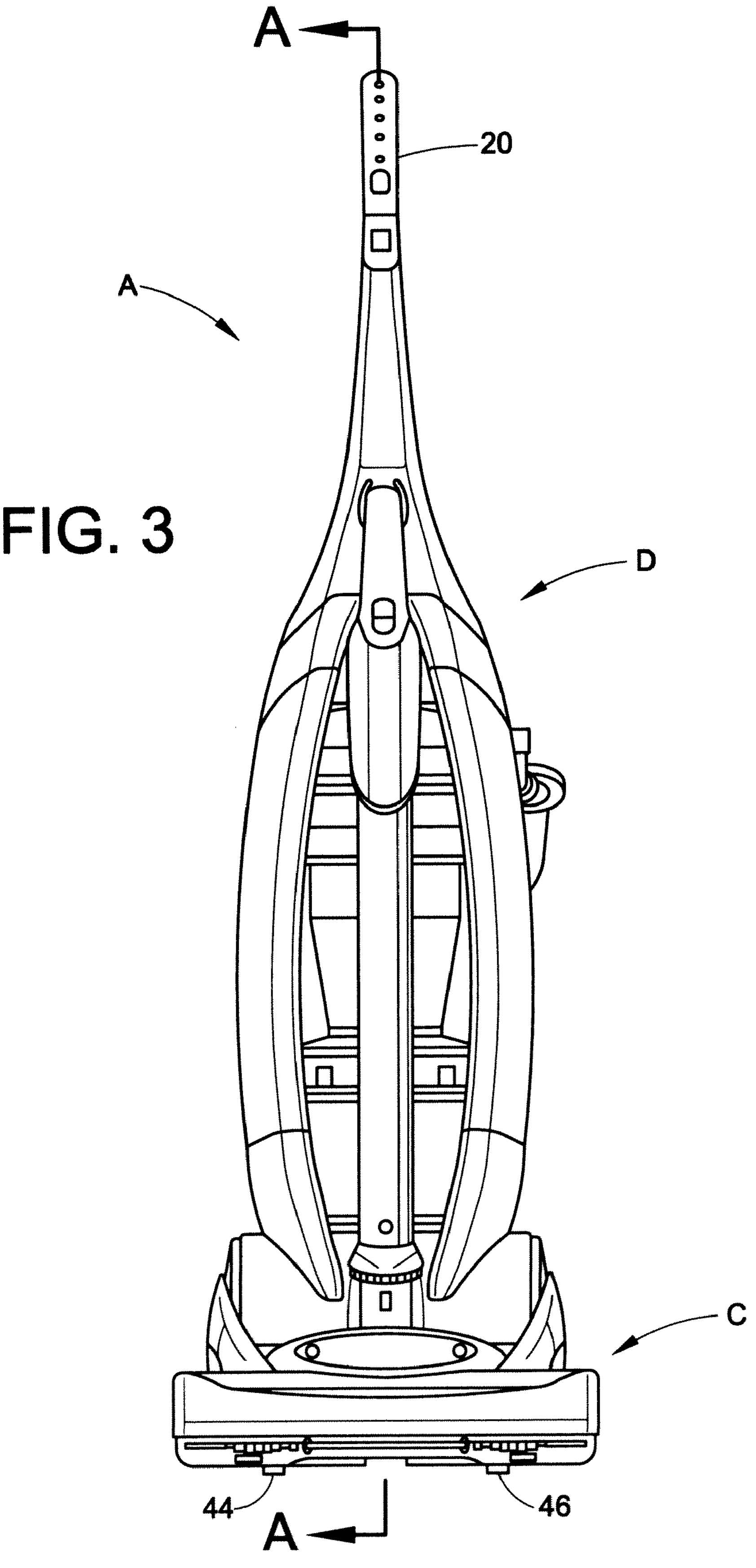
FIG. 3 is a front elevational view of the vacuum cleaner of FIG. 1.

Referring now to the drawings, wherein the drawings illustrate the preferred embodiments of the present invention only and are not intended to limit same, FIGS. 1-3 illustrate an upright single stage vacuum cleaner A including an electric motor and fan assembly B, a nozzle base C, and a dirt container assembly D mounted on top of the motor and fan assembly via conventional means. The motor and fan assembly B and the nozzle base C are pivotally or hingedly connected through the use of trunnions or another suitable hinge assembly, so that the motor and fan assembly including the dirt container assembly D pivots between a generally vertical storage position (as shown) and an inclined use position. The nozzle base C and portions of the dirt container assembly D can be made from conventional materials, such as molded plastics and the like. A handle 20 extends upward from the dirt container assembly, by which an operator of the vacuum cleaner A is able to grasp and maneuver the vacuum cleaner.

Figure 4:
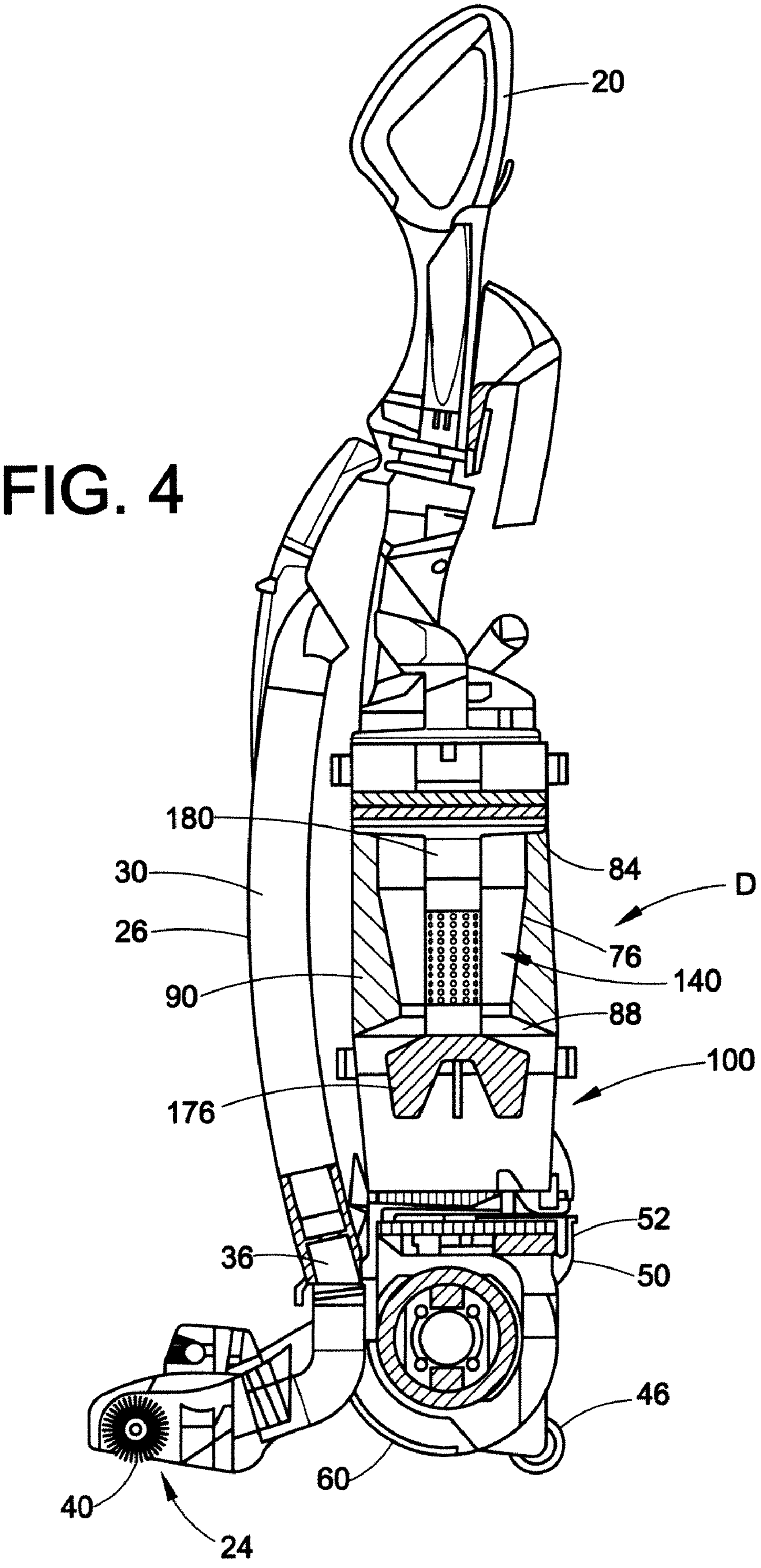
FIG. 4 a cross-sectional view taken generally along section lines A-A of the vacuum cleaner of FIG. 3.
Figure 10:
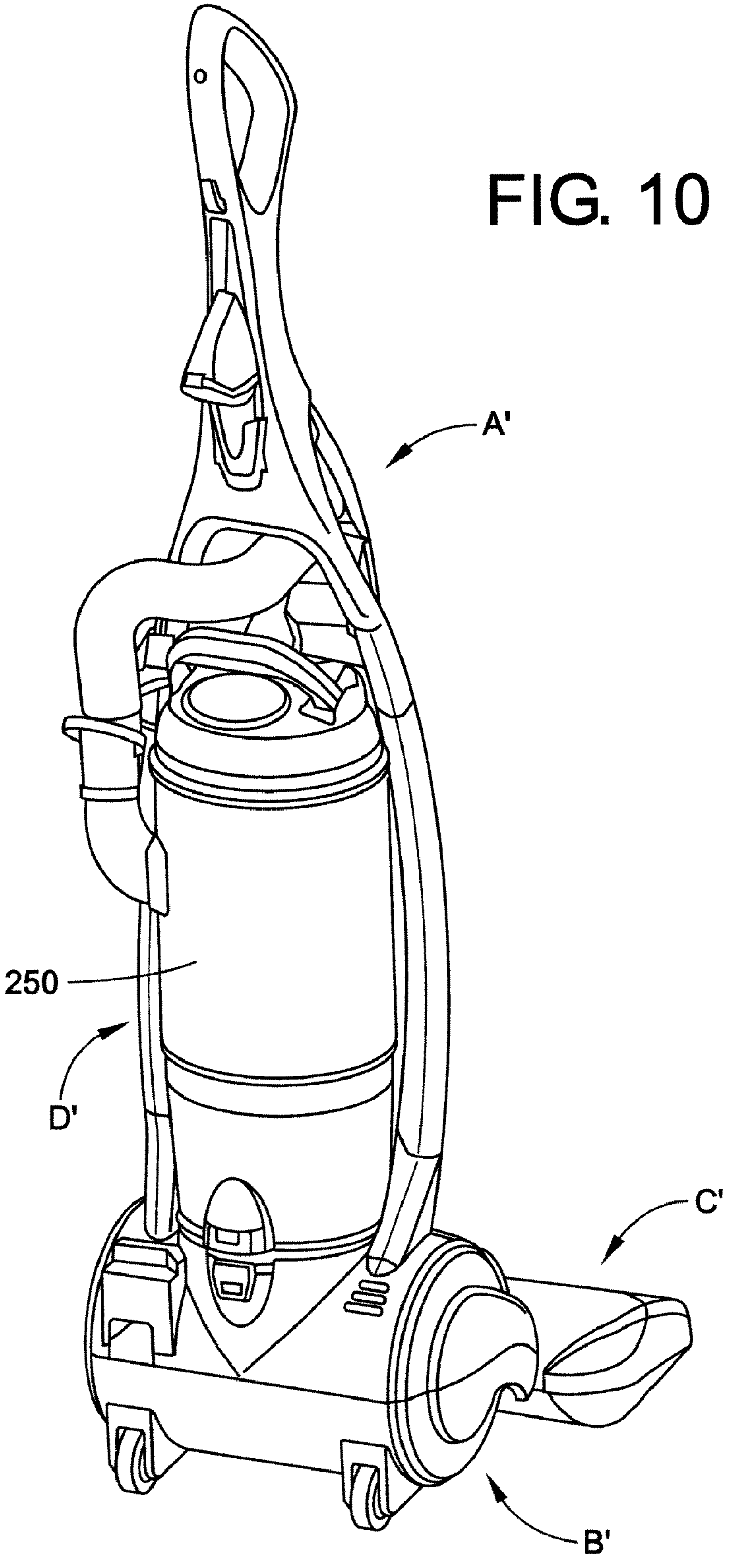
FIG. 10 is a rear perspective view of the vacuum cleaner of FIG. 9.

During vacuuming operations, the nozzle base C travels across a floor, carpet, or other subjacent surface being cleaned. As shown in FIG. 4, an underside of the nozzle base includes a main suction opening 24 formed therein. Such opening 24 can extend substantially across the width of the nozzle at the front end thereof. As is known, the main suction opening is in fluid communication with the dirt container assembly D through a conduit, which can be a center dirt passage 26. The center dirt passage includes a first section 30 having a longitudinal axis generally parallel to a longitudinal axis of the dirt container assembly and a second section (not visible in FIG. 4 but illustrated in the alternative embodiment of FIG. 10) which directs the air tangentially into the dirt container assembly.

With continued reference to FIG. 4, a connector hose assembly, such as at 36, fluidly connects the air stream from the main suction opening to the center dirt passage. A rotating brush assembly 40 is positioned in the region of the nozzle main suction opening 24 for contacting and scrubbing the surface being vacuumed to loosen embedded dirt and dust. A plurality of rollers, casters or wheels 44, 46 supports the nozzle base C on the surface being cleaned and facilitates its movement thereacross. The electric motor and fan assembly B is mounted to a base member 50 which releasably supports the dirt container assembly D. A latch assembly 52 can be mounted to the base member for securing the dirt container assembly thereto.

As shown in FIG. 4, the electric motor and fan assembly B can be housed in a motor housing 60 mounted to the base member 50. The motor and fan assembly generates the required suction airflow for cleaning operations by creating a suction force in a suction inlet and an exhaust force in an exhaust outlet. The motor and fan assembly airflow exhaust outlet can be in fluid communication with an exhaust grill 62 (FIG. 2) covering an exhaust duct (not visible). If desired, a final filter assembly can be provided for filtering the exhaust air stream of any contaminants which may have been picked up in the motor assembly immediately prior to its discharge into the atmosphere. The motor assembly suction inlet, on the other hand, is in fluid communication with the dirt container assembly D of the vacuum cleaner A to generate a suction force therein.

Figure 5:
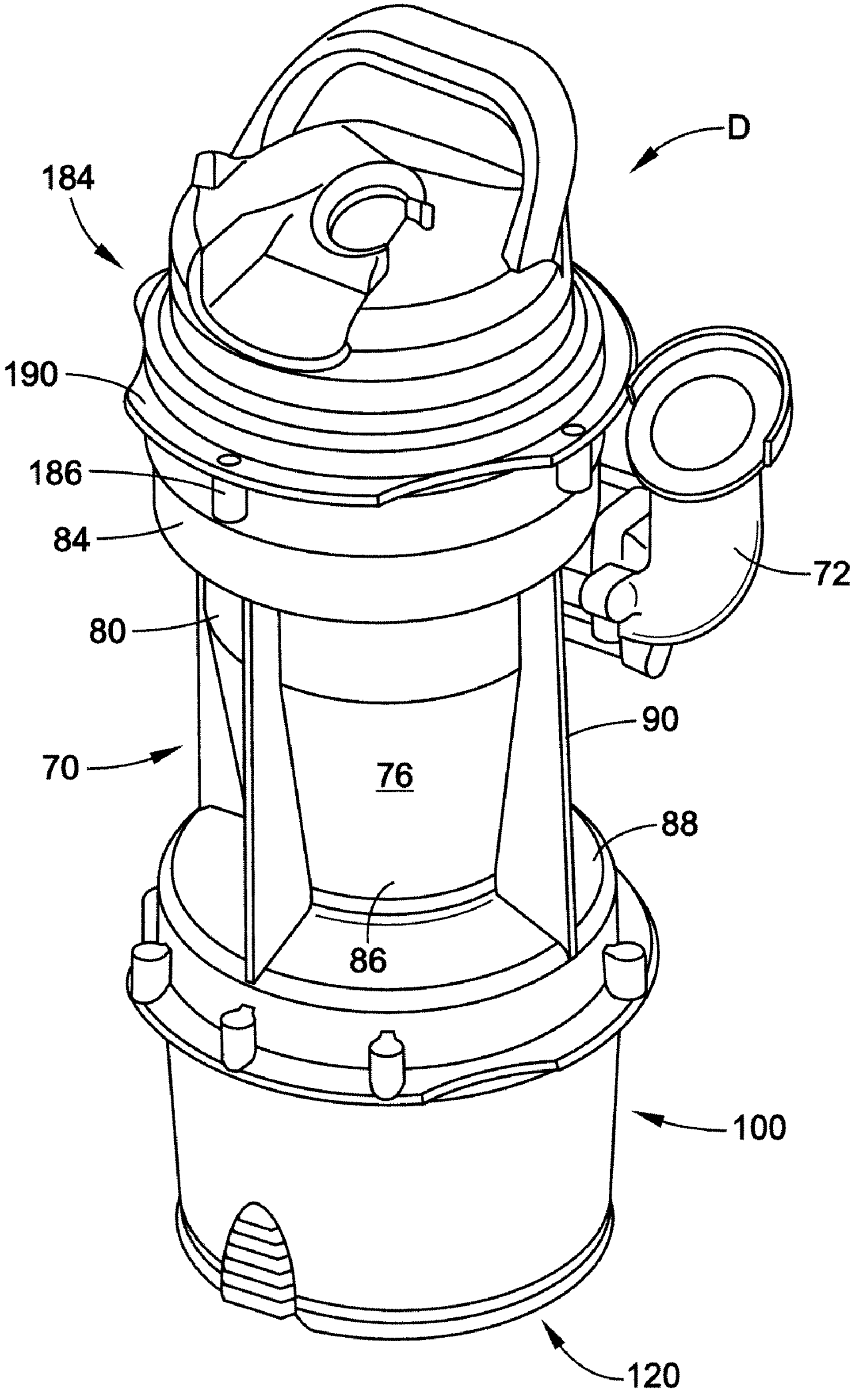
FIG. 5 is an enlarged front perspective view of a dirt container assembly for the vacuum cleaner of FIG. 1.
Figure 6:
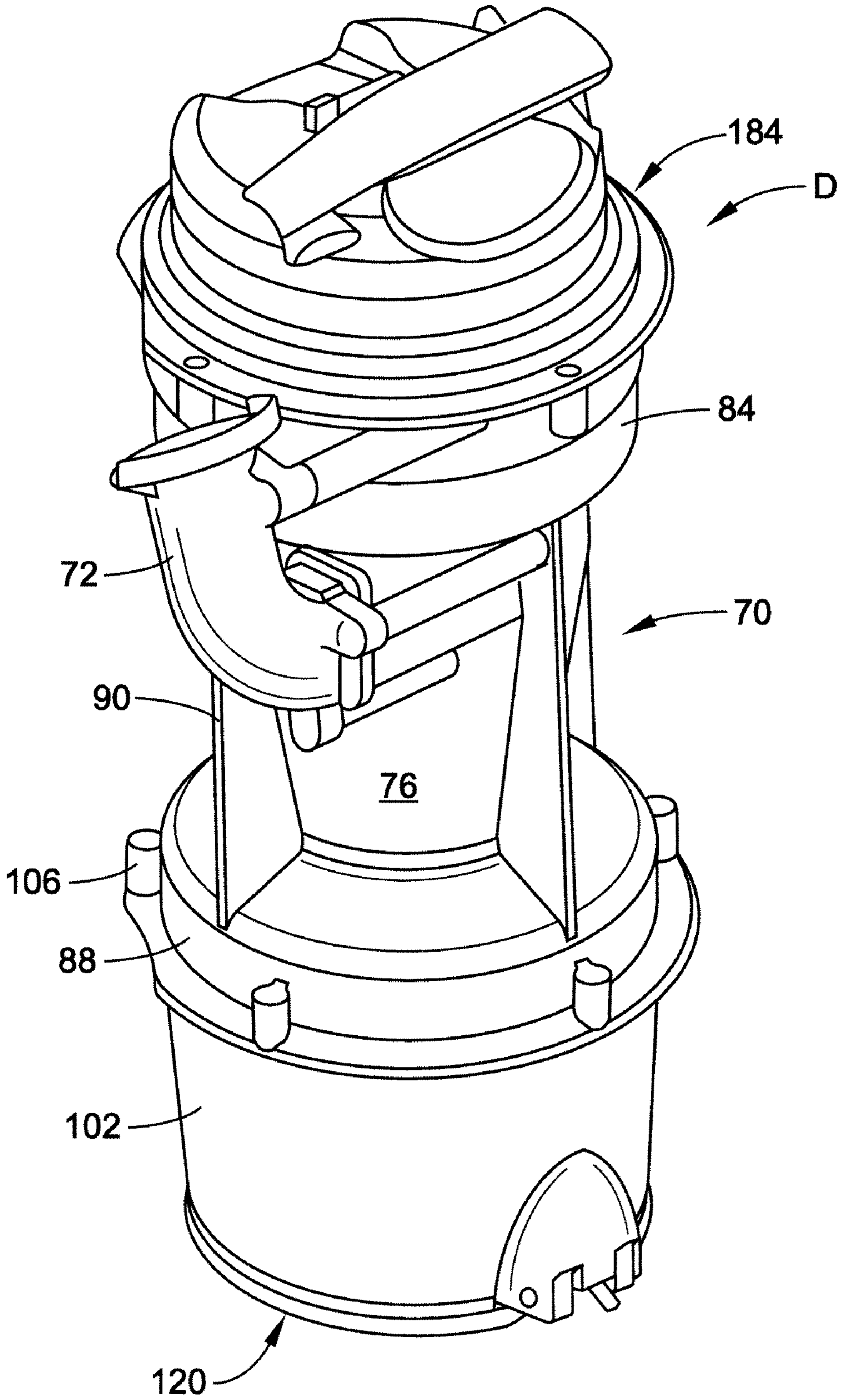
FIG. 6 is a rear perspective view of the dirt container assembly of FIG. 5.

With reference to FIGS. 5 and 6, the dirt container assembly D includes a single, generally frusto-conical cyclonic separator 70 and a dirty air inlet conduit 72. The separator includes a sidewall 76 having an outer surface and an inner surface. The conduit 72 has an inlet section in fluid communication with the center dirt passage 26 and an outlet section in fluid communication with a dirty air inlet of the separator. The dirty air inlet of the separator can be generally rectangular in cross-section. It should be appreciated that the outlet section can have a varying dimension which allows the air stream to be drawn into the separator 70 by way of the venturi effect, which increases the velocity of the air stream and creates an increased vacuum in the separator dirty air inlet. For example, the dirty air inlet conduit 72 can include a decreasing cross-sectional area. Alternatively, the dirty air conduit can transition from a rectangular cross-sectional area into a venturi-type discharge opening.

As best shown in FIG. 2, the outer surface of the sidewall 76 forms at least a part of an external surface of the vacuum cleaner A. An upper end 80 of the separator is secured to an upper inverted skirt 84 and a lower end 86 of the separator is secured to a lower skirt 88. At least one stiffening rib 90 can extend outwardly from the outer surface of said separator 70 for supporting the separator. In the depicted embodiment, four equally spaced apart stiffening ribs 90 extend generally outwardly from the outer surface of the separator. However, it should be appreciated that more or less than four stiffening ribs can be used to support the separator. Each rib or ribs can be integrally formed with or be of one piece with the separator 70. For example, the separator can be molded of a suitable thermoplastic material.

Figure 7:
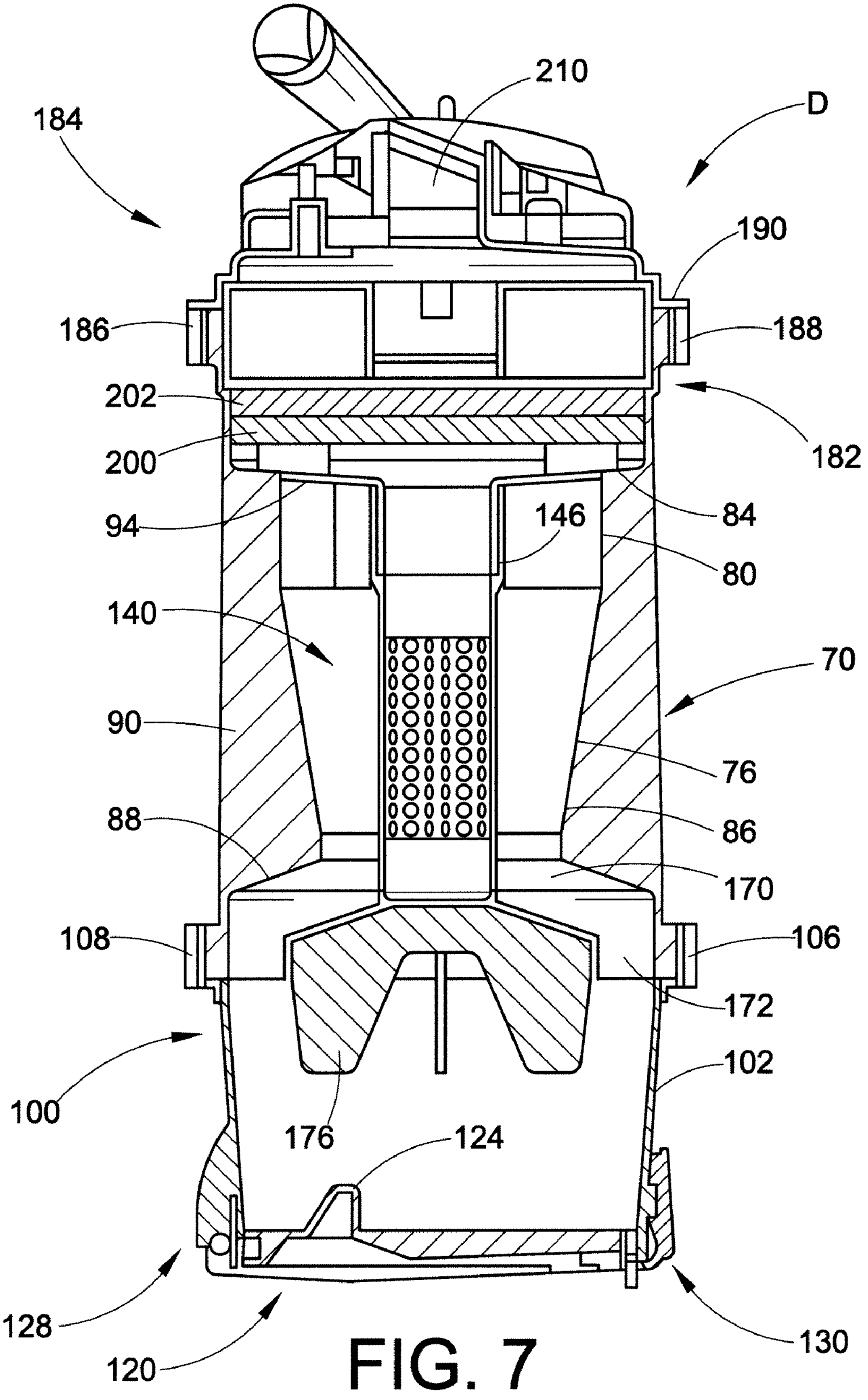
FIGS. 7 and 8 are cross-sectional views of the dirt container assembly of FIG. 5 taken along lines generally normal to each other.
Figure 8:
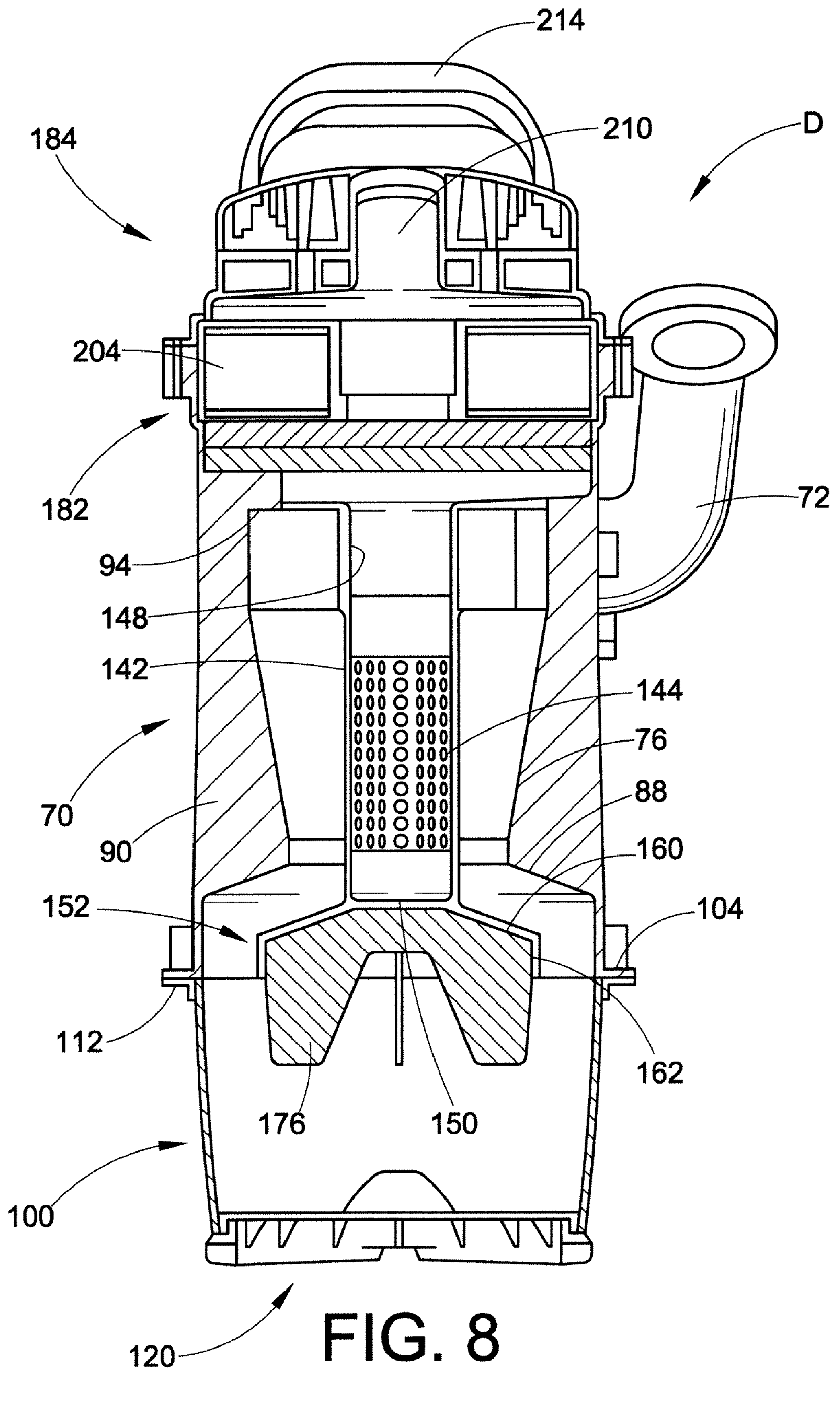
Figure 9:
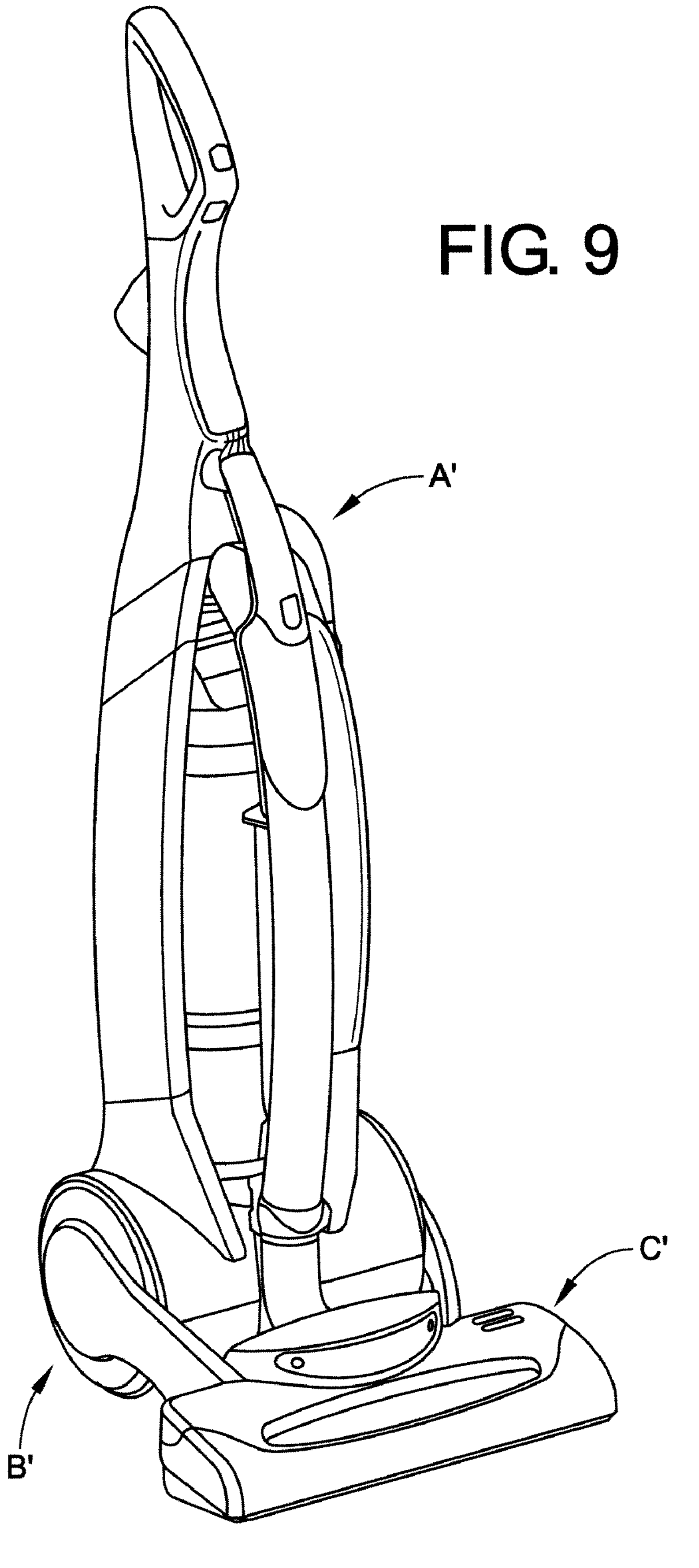
FIG. 9 is a front perspective view illustrating a single stage cyclone vacuum cleaner in accordance with a second embodiment of the present invention.

The airflow into the separator 70 is tangential which causes a vortex-type, cyclonic or swirling flow. Such vortex flow is directed downwardly in the separator by a top wall 94 of the separator. Cyclonic action in the separator 70 removes the entrained dust and dirt from the suction air stream and causes the dust and dirt to be deposited in a dust collector section or a dirt cup 100. As shown in FIGS. 7 and 8, the lower skirt 88 is secured to an upper portion of a wall 102 of the dirt cup. In particular, the lower skirt includes an annular flange 104 having a plurality of external bosses 106. Each boss includes an opening 108 in registry with an opening (not shown) located on a flange 112 of the dirt cup. The openings receive conventional fasteners which securely attach the lower skirt 88 to the dirt cup 100. The dirt cup 100 and the separator 70 can be made of a transparent material so that the presence of dirt can be seen in the dirt container assembly D.

The wall 102 of the dirt cup 110 generally extends inwardly at an acute angle towards a bottom plate or lid 120 which is pivotally secured to a lower portion of the dirt cup wall 102. The bottom lid allows for emptying of the dirt cup. The bottom lid can include a raised section or projection 124. A hinge assembly 128 can be used to mount the bottom lid to a bottom portion of the dirt cup. The hinge assembly allows the bottom lid to be selectively opened so that dirt and dust particles that were separated from the air stream by the separator 70 can be emptied from the dirt container assembly D. A latch assembly 130, which can be located diametrically opposed from the hinge assembly, can maintain the lid in a closed position. Normally, the latch assembly maintains the lid in a closed position.

With continued reference to FIGS. 7 and 8, a perforated tube 140 is disposed within the separator 70 and extends longitudinally from the top wall 94 of the separator. In the present embodiment, the perforated tube has a longitudinal axis coincident with the longitudinal axes of the separator and the dirt cup thereby creating a central air path; although, it should be appreciated that the respective axes can be spaced from each other. The perforated tube includes a cylindrical section 142. A plurality of openings or perforations 144 is located around a portion of the circumference of the cylindrical section. The openings are useful for removing threads and fibers from the air stream which flows into the perforated tube. As might be expected, the diameter of the openings 144 and the number of those openings within the perforated tube 140 directly affect the filtration process occurring within the dirt cup. Also, additional openings result in a larger total opening area and thus the airflow rate through each opening is reduced. Thus, there is a smaller pressure drop and lighter dust and dirt particles will not be as likely to block the openings. The openings 144 serve as an outlet from the separator 70.

An upper end 146 of the perforated tube is mounted to a mouth 148 extending downwardly from the upper inverted skirt 84. In particular, the upper end of the perforated tube has an inner diameter greater than an outer diameter of the mouth of the upper inverted skirt such that the mouth is received in the upper end. These two elements can be secured together by adhesives, frictional welding or the like. It can be appreciated that the perforated tube can be made removable from the dirt container assembly for cleaning purposes.

Connected to a lower, closed end 150 of the perforated tube is a shroud 152 for retarding an upward flow of dirt and dust particles that have fallen below the lower end 86 of the separator 70. The shroud has an outwardly flared section 160 and a flange 162 extending downwardly from the flared section. As is best illustrated in FIGS. 7 and 8, a diameter of the shroud, particularly an end of the outwardly flared section, is larger than a diameter of the separator lower end 86 and an inside diameter of the dirt cup 100 is substantially larger than the diameter of the separator lower end. This prevents dust from being picked up by flow of air streaming from the dirt cup 100 toward the openings 144 of the perforated tube. The flared section 160 of the shroud 152, which is generally parallel to the lower skirt 88, and the lower skirt define a first air channel 170 for directing air from the separator into the dirt cup 100. The shroud flange 162, which is generally parallel to the dirt cup wall 102, and the dirt cup wall define a second air channel 172 for directing air from the separator into the dirt cup. The first air channel and the second air channel have a substantially constant volume for maintaining airflow velocity. Also, the volume of the first air channel is approximately equal to the volume of the second air channel.

A laminar flow member, such as one or more baffles or fins 176, is mounted to the closed lower end 150 of the perforated tube 140. At least a portion of the laminar flow member is encircled by the shroud 152. The laminar flow member extends generally along a longitudinal axis of the perforated tube and partially into the dirt cup 100. As shown in FIGS. 7 and 8, the depicted baffle 176 can be cruciform in shape and include a cross blade assembly, which can be formed of two flat blade pieces that are oriented approximately perpendicular to each other. It should be appreciated that the baffles 176 is not limited to the configuration shown in FIGS. 7 and 8 but may be formed of various shapes. For example, if a blade is employed, it can have a rectangular shape, a triangular shape or an elliptical shape, when viewed from its side. Also, in addition to a cross blade design, other designs are also contemplated. Such designs can include blades that are oriented at angles other than normal to each other or that use more than two sets of blades. These baffles can assist in allowing dirt and dust particles to fall out of the air stream between the perforated tube lower end 150 and the bottom lid 120 of the dirt cup 100.

With reference again to FIG. 4, an upper end or air outlet 180 of the perforated tube 140 is in fluid communication with the mouth 148 of the inverted upper skirt 84 positioned above the separator 70. The inverted upper skirt collects a flow of air after it has been cleaned by the separator and has flowed through the perforated tube. The skirt directs the cleaned air through a filter, such as a two stage filter element 182, partially housed in the upper skirt and a cyclone cover 184, for filtering any remaining fine dust remaining in the airflow exiting the separator. In this embodiment, the two stage filter element 182 includes at least one foam filter. Such a filter can be a compound member with a coarse foam layer 200 and a fine foam layer 202, at least partially housed in the upper skirt and the cover. The two foam filters can, if desired, be secured to each other by conventional means. Located downstream therefrom can be a pleated filter 204, such as a HEPA filter, housed in the cover. By housing the pleated filter in the cover 184, there is no need for an additional filter plenum and the foam filters are separated from the pleated filter. The two stage filter element 182 and the pleated filter 204 can both be easily serviced by removing the cyclone cover which separates the two stage filter element from the pleated filter. This separation of the filters prevents transfer of dust from the two stage filter element to the pleated filter during service.

With reference again to FIGS. 5 and 6, the cyclone cover 184 is releasably mounted to the inverted upper skirt 84. In particular, the upper skirt includes a plurality of external bosses 186, each boss including an opening 188 in registry with an opening located on an annular flange 190 of the cover (FIG. 7). The openings receive conventional fasteners which attach the cover to the upper skirt. It should be appreciated that the cover can be hingedly mounted to the upper skirt to provide access to the perforated tube, separator and filter assembly for cleaning.

As shown in FIGS. 7 and 8, the cyclone cover 184 collects a flow of cleaned air from the upper skirt 84 and the filters 182 and 204 and merges the flow of cleaned air into a cleaned air outlet conduit 210 in fluid communication with an inlet of the electric motor and fan assembly B. The cover can also include a handle 214 for ease of handling of the dust container assembly D.

In operation, dirt entrained air passes into the separator 70 through the inlet section of the conduit 72 which is oriented generally tangentially with respect to the sidewall 76 of the separator. The air then travels around the separator where many of the particles entrained in the air are caused, by centrifugal force, to travel along the interior surface of the sidewall of the separator and drop out of the rotating air flow by gravity. These particles travel through the first and second air channels 170, 172, respectively, and are collected in the dirt cup 100. However, relatively light, fine dust is less subject to a centrifugal force. Accordingly, fine dust may be contained in the airflow circulating near the bottom portion of the dirt cup. Since the baffle 176 extends into the bottom portion of the dirt cup, the circulating airflow hits the baffle and further rotation is stopped, thereby forming a laminar flow. In addition, if desired, extending inwardly from a bottom portion of the wall 102 of the dirt cup 110 can be laminar flow members which further prevent the rotation of air in the bottom of the dirt cup. As a result, the most of the fine dust entrained in the air is also allowed to drop out. The partially cleaned air travels through the openings 144 of the perforated tube 140, into the upper skirt 84, and through the filters 182, 204 to the cleaned air outlet 210, which in fluid communication with the air inlet to the electric motor and fan assembly B. To clean the dirt cup 100 and remove the dirt separated by the single stage cyclone, the dirt container assembly D is lifted away from the vacuum cleaner A and the bottom lid 120 is pivoted open. The hinge assembly 128 allows the bottom lid to be selectively opened so that dirt and dust particles that were separated from the air stream can be emptied from the dirt container assembly D.

Similar to the aforementioned embodiment, an additional embodiment of the dirt container assembly is shown in FIGS. 9-13. Since most of the structure and function is substantially identical, reference numerals with a single primed suffix (') refer to like components (e.g., separator 70 is referred to by reference numeral 70'), and new numerals identify new components in the additional embodiment.

Figure 11:
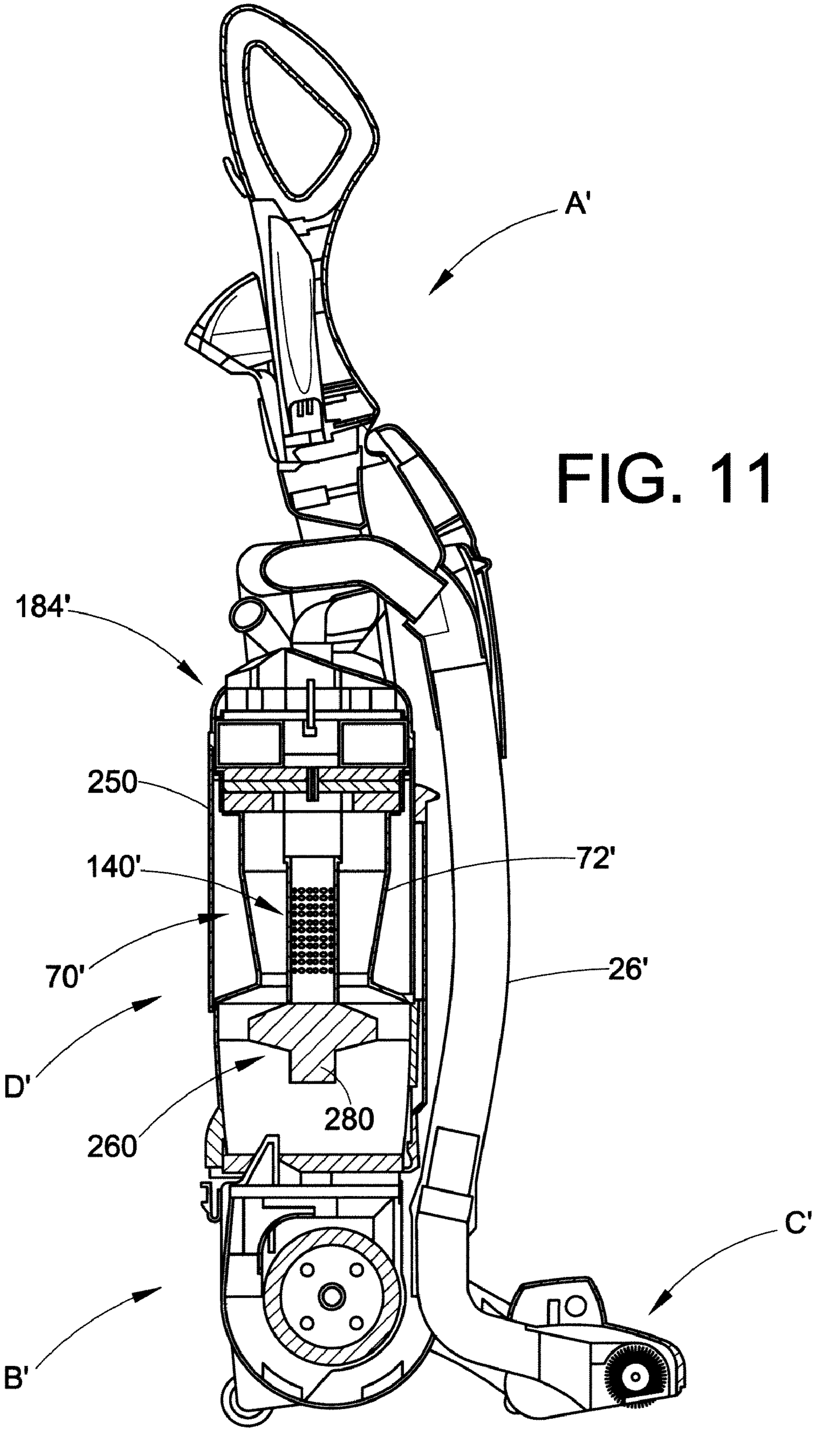
FIG. 11 a cross-sectional view of the vacuum cleaner of FIG. 9.
Figure 12:
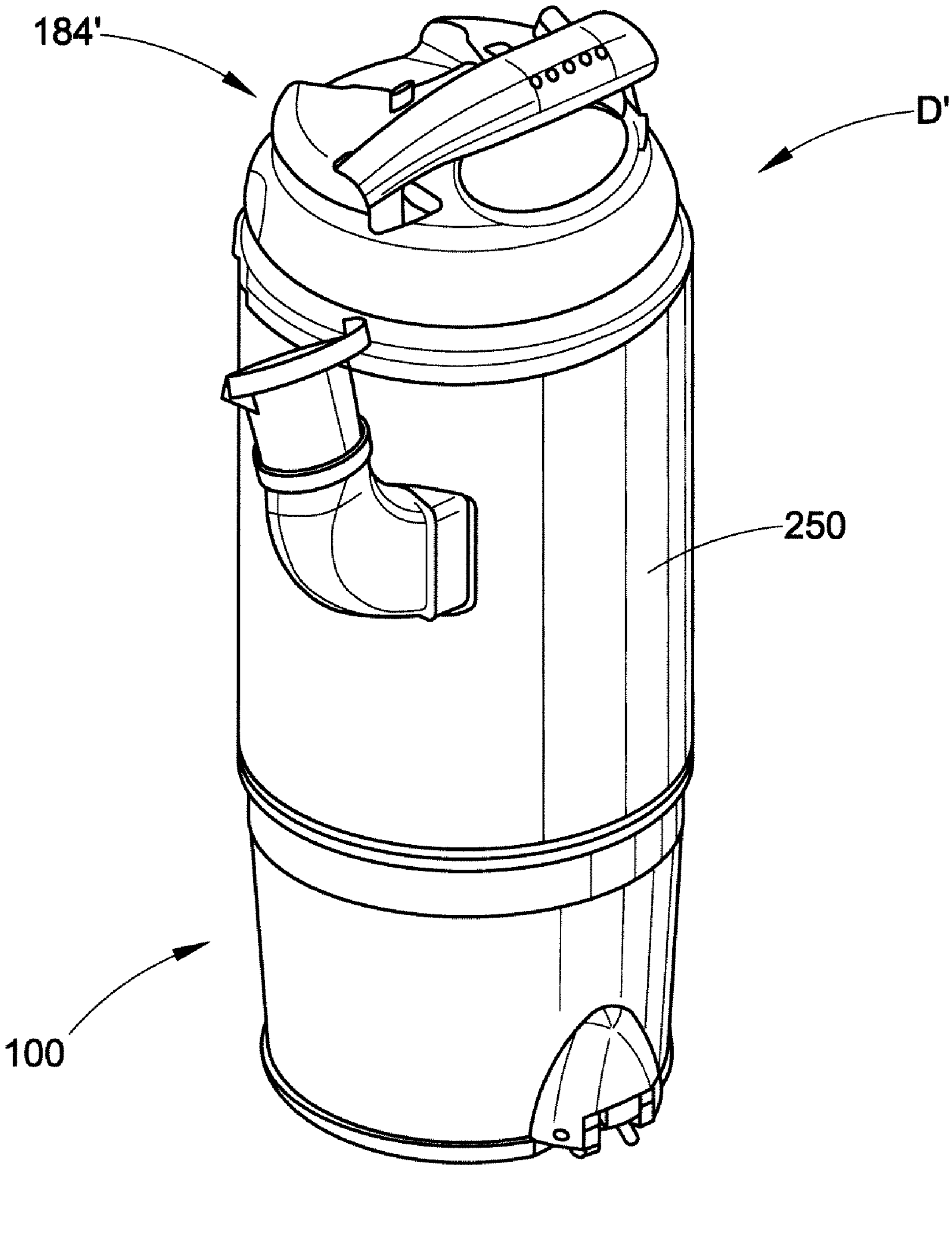
FIG. 12 is an enlarged front perspective view of a dirt container assembly for the vacuum cleaner of FIG. 9.

In this embodiment, as shown in FIG. 11, the dirt container assembly D' includes a container 250 spaced from and at least partially surrounding a separator 70'. The container includes a sidewall 252 having an outer surface and an inner surface. The outer surface of the container sidewall forms an external surface of said vacuum cleaner. Although not illustrated, at least one support rib can extend outwardly from an outer surface 72' of the separator and contact the inner surface of the container side wall.

Figure 13:
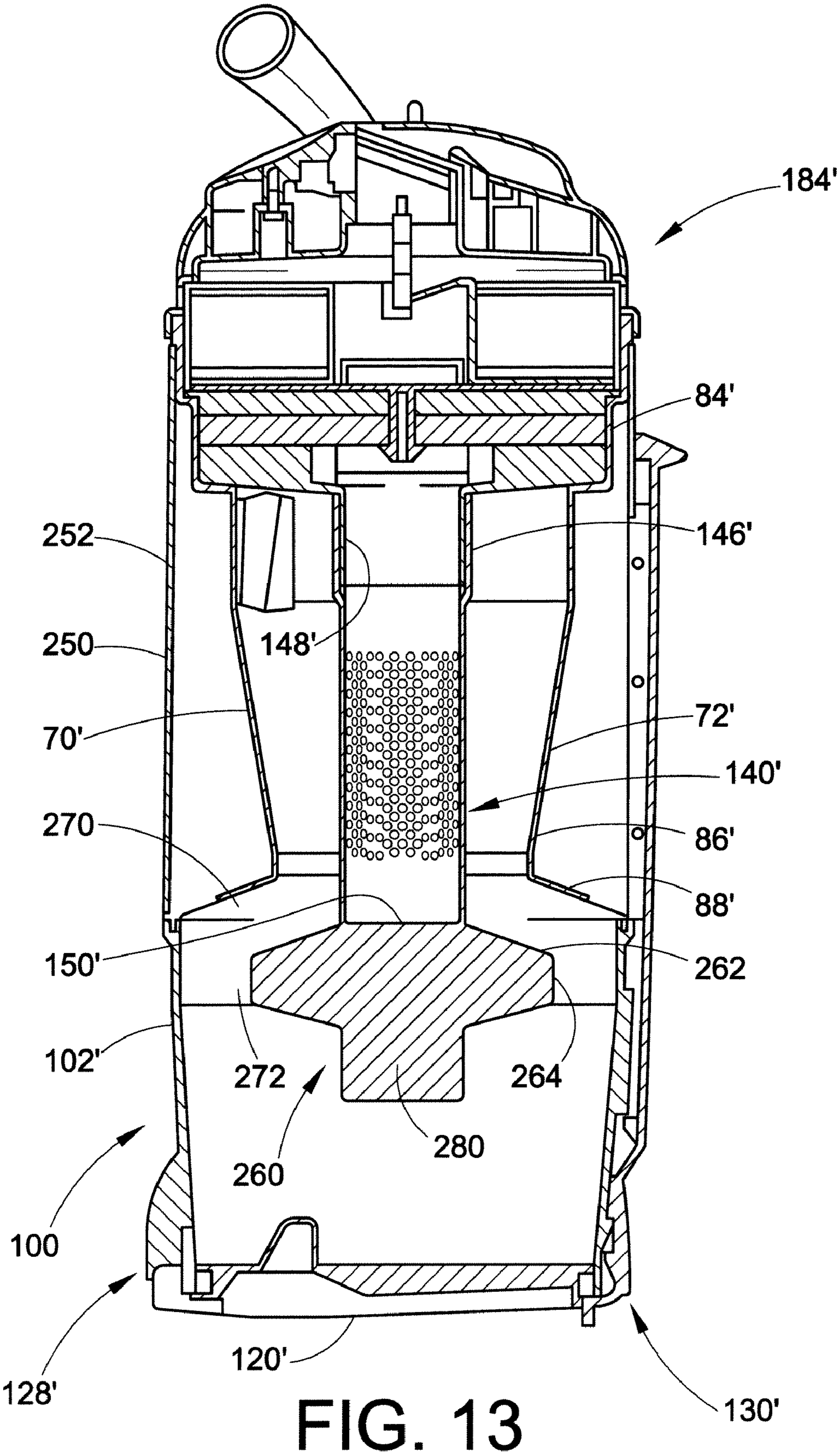
FIG. 13 is a cross-sectional view of the dirt container assembly of FIG. 12.

The container 250 can be suitably secured to the separator by conventional means. With reference to FIG. 13, in this embodiment, an upper end of the container is secured to the upper inverted skirt 84' and a bottom end of the container is secured to the lower skirt 88'. In particular, the respective ends of the container and dimensioned to frictionally receive therein the respective skirts, thereby creating a seal between the container and the separator. However, it should be appreciated that the lower and upper ends of container can be mounted to a dirt cup 100' and a cyclone cover 184', respectively.

Similar to the first embodiment, a perforated tube 140' extends longitudinally within the separator 70'. An upper end 146' of the perforated tube is mounted to a mouth 148' extending downwardly from the upper inverted skirt 84'. Connected to a lower, closed end 150' of the perforated tube are a shroud 260 and a baffle 280 for retarding an upward flow of dirt and dust particles that has fallen below the separator 70'. It should be apparent from a comparison of FIGS. 13 and 8 that the baffles 280 and 176 have different geometries. The shroud 260 has an outwardly flared section 262 and a flange 264 extending downwardly from the flared section. As is best illustrated in FIG. 13, a diameter of an end of the outwardly flared section is larger than a diameter of a separator lower end 86'. The flared section 262, which is generally parallel to the lower skirt 88', and the lower skirt define a first air channel 270 for directing air from the separator into the dirt cup 100'. The shroud flange 264, which is generally parallel to a dirt cup wall 102', and the dirt cup wall define a second air channel 272 for directing air from the separator into the dirt cup. The first air channel and the second air channel have a substantially constant volume for maintaining airflow velocity. The volume of the first air channel is approximately equal to the volume of the second air channel.

As to a further discussion of the manner of usage and operation of the second embodiment, the same should be apparent from the above description relative to the first embodiment. Accordingly, no further discussion relating to the manner of usage and operation will be provided.

In yet another embodiment (not illustrated), the electric motor and fan assembly includes an ultraviolet (UV) germicidal light source and a second pleated filter, such as a HEPA filter. The UV light is not mounted in the cyclone cover because the foam filters are generally sensitive to UV-C radiation and tend to disintegrate. The HEPA filter filters any remaining contaminants prior to discharge of the air stream into the atmosphere. The UV light source generates a magnetic or electric field capable of emitting radiation powerful enough to destroy bacteria and viruses. The UV light source is preferably disposed adjacent the HEPA filter so that the UV light source can shine on the filter. It has been proven that the residence time of bacteria, fungi and/or viruses trapped in or on the filter is great enough that exposure to the UV light source will either destroy the micro-organism or neutralize its ability to reproduce. The UV light source can be electrically connected to the same power source that powers the electric motor and fan assembly.

The present invention has been described with reference to the preferred embodiments. Obviously, modifications and alterations will occur to others upon reading and understanding the preceding detailed description. It is intended that the present invention be construed as including all such modifications and alterations insofar as they come within the scope of the appended claims or the equivalents thereof.

What we claim is:

1. An upright vacuum cleaner comprising:

a housing;

a nozzle base including a main suction opening, said housing being pivotally mounted to said nozzle base;

said housing comprising:

a cyclonic separator including a dirty air inlet and a sidewall, a lower end of said separator being secured to a lower skirt, said lower skirt having an outwardly flared section;

a dust collector section located beneath said separator for receiving and retaining dirt and dust separated by said cyclonic separator, the dust collector section including a sidewall; and a perforated tube disposed within said separator, said perforated tube including a shroud extending away from a closed lower end of said perforated tube, wherein a diameter of said shroud is larger than a diameter of said separator lower end, and wherein said shroud includes an outwardly flared section having a length generally equal to a length of said flared section of said lower skirt, said flared section of said lower skirt and said flared section of said shroud defining a first air channel for directing air from said separator into said dust collector section, said first air channel providing a substantially constant airflow velocity over an entire length of the first air channel.

2. The vacuum cleaner of claim 1, wherein said shroud includes a flange extending downwardly from said flared section, said shroud flange and said dust collector section sidewall defining a second air channel in fluid communication with said first air channel for directing air from said separator into said dust collector section, wherein said second air channel has a substantially constant airflow velocity over a length of the second air channel.

3. The vacuum cleaner of claim 2, wherein said airflow velocity of said first air channel is approximately equal to said airflow velocity of said second air channel.

4. The vacuum cleaner of claim 1, further comprising a laminar flow member extending away from said closed lower end of said perforated tube, wherein at least a portion of said laminar flow member is encircled by said shroud.

5. The vacuum cleaner of claim 1, wherein said perforated tube extends longitudinally within the separator and includes:

an upper end mounted to a mouth extending downwardly from an upper end of said separator, and a plurality of small holes disposed in a side wall of said tube.

6. The vacuum cleaner of claim 1, wherein said dust collector section has a diameter substantially larger than a diameter of said lower end of said separator.

7. The vacuum cleaner of claim 1, further comprising a filter assembly at least partially housed in a cover removably secured to a top portion of the separator, said filter assembly including at least one foam layer and a pleated filter.

8. An upright vacuum cleaner including:

a housing including a longitudinal axis;

a nozzle base having a main suction opening, said housing being pivotally mounted on said nozzle base;

an airstream suction source mounted to one of said housing and said nozzle base for selectively establishing and maintaining a suction airstream flowing from said nozzle main suction opening to an exhaust outlet of said suction source;

a dirt cup selectively mounted to said housing; and a cyclonic separator mounted to said housing, said separator including a dirty air inlet and a sidewall tapering from an upper end of a first diameter to a lower end of a second diameter which is smaller than said first diameter, said sidewall also including an outer surface and an inner surface, said outer surface of said sidewall forming at least a part of an external surface of said vacuum cleaner, wherein said longitudinal axis of said housing extends through said separator.

9. The vacuum cleaner of claim 8, wherein said upper end of said separator is secured to an upper inverted skirt and said lower end of said separator is secured to a lower skirt.

10. The vacuum cleaner of claim 8, further comprising at least one stiffening rib for supporting said separator, said at least one stiffening rib extending outwardly from said outer surface of said separator.

11. The vacuum cleaner of claim 10, wherein said at least one stiffening rib has an upper end integrally formed with said upper end of said separator and a lower end integrally formed with said lower end of said separator.

12. An upright vacuum cleaner comprising:

a housing having a suction airstream inlet and a suction airstream outlet;

a dirt container assembly selectively mounted to said housing for receiving and retaining dirt and dust separated from said suction airstream, wherein said suction airstream inlet and said suction airstream outlet are in fluid communication with, respectively, an inlet and an outlet of said dirt container assembly, said dirt container assembly including:

a cyclonic separator including a dirty air inlet and a sidewall having an outer surface and an inner surface;

at least one support rib extending outwardly from said outer surface of said separator for supporting said separator; and, an airstream suction source mounted to said housing, said suction source being in communication with said outlet of said dirt container assembly.

13. The vacuum cleaner of claim 12, wherein at said outer surface of said sidewall of said separator forms a part of an external surface of said vacuum cleaner.

14. The vacuum cleaner of claim 12, wherein said at least one support rib forms a part of an external surface of said housing.

15. The vacuum cleaner of claim 12, further comprising:

a dust collector section located beneath said separator, a cover selectively mounted to a top portion of said separator, and a filter assembly including a foam layer and a pleated filter at least partially housed in said cover, wherein removal of said cover separates said foam layer from said pleated filter.

16. The vacuum cleaner of claim 12, further comprising:

a perforated tube disposed within the separator, said perforated tube creating a central air path within said separator, a shroud extending away from a closed lower end of said perforated tube, and a laminar flow member extending away from said closed lower end of said perforated tube, wherein at least a portion of said laminar flow member is encircled by said shroud.

17. The vacuum cleaner of claim 12, wherein said dirt container assembly further comprises a container at least partially surrounding said separator, said container including a sidewall having an outer surface and an inner surface.

18. The vacuum cleaner of claim 17, wherein said at least one support rib extends outwardly from said outer surface of said separator and contacts said inner surface of said container side wall.

19. The vacuum cleaner of claim 12, wherein said outer surface of said container sidewall forms an external surface of said vacuum cleaner.

20. The vacuum cleaner of claim 12, wherein said dirty air inlet of said separator is generally rectangular in cross-section.

21. The vacuum cleaner of claim 20, wherein said dirty air inlet of said separator includes a decreasing cross-sectional area thereby increasing the velocity of the airstream entering tangentially into said separator.

22. The vacuum cleaner of claim 20, wherein said dirty air inlet of said separator transitions from said rectangular cross-sectional area into a venturi-type discharge opening thereby increasing the velocity of the airstream entering tangentially into said separator.

23. A dirt container assembly for an upright vacuum cleaner comprising:

a generally frusto-conical cyclonic separator including a dirty air inlet and a sidewall, a lower end of said separator being secured to a lower skirt;

a perforated tube disposed within said separator and including a shroud extending away from a closed lower end of said perforated tube, said shroud having an outwardly flared section and a flange extending downwardly from said flared section;

a dust collector section located beneath said separator, the dust collector section including a sidewall; and, wherein said flared section of said shroud is generally parallel to said lower skirt and said flange of said shroud is generally parallel to said dust collector section sidewall, wherein said lower skirt and said shroud flared section define a first air channel having a first longitudinal axis and said shroud flange and an inner surface of said sidewall of said dust collector section define a second air channel having a second longitudinal axis, said second air channel being in communication with said first air channel, said first and second air channels directing air from said separator into said dust collector section, and wherein a cross-sectional area along any plane taken generally normal to said first and second longitudinal axes is substantially constant.

24. The dirt container assembly of claim 23, wherein an end of said outwardly flared section has a diameter larger than a diameter of a lower end of said separator.

25. The dirt container assembly of claim 23, wherein an upper end of said separator is secured to an upper inverted skirt.

26. The dirt container assembly of claim 23, wherein said first air channel has a substantially constant volume for maintaining a substantially constant airflow velocity.

27. The dirt container assembly of claim 26, wherein said second air channel has a substantially constant volume for maintaining a substantially constant airflow velocity.

28. The dirt container assembly of claim 23, wherein said sidewall of said dust collector section extends inwardly from said separator at an acute angle.

* * * * *

UNITED STATES PATENT AND TRADEMARK OFFICE

CERTIFICATE OF CORRECTION

PATENT NO. : 7,632,324 B2
APPLICATION NO. : 11/436798
DATED : December 15, 2009
INVENTOR(S) : Makarov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 768 days.

Signed and Sealed this

Second Day of November, 2010

David J. Kappos

David J. Kappos
*Director of the United States Patent and Trademark Office*